(12) United States Patent
Yoo et al.

(10) Patent No.: US 10,899,395 B2
(45) Date of Patent: Jan. 26, 2021

(54) UNIT OF COMBINED FRONT BUMPER BEAM AND FRONT END MODULE INCLUDING CRASH BOX HAVING DUAL-SECTIONAL STRUCTURE

(71) Applicants: Hyundai Motor Company, Seoul (KR); Kia Motors Corporation, Seoul (KR)

(72) Inventors: Young-Dae Yoo, Gyeonggi-do (KR); Do-Hoi Kim, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 37 days.

(21) Appl. No.: 16/359,500

(22) Filed: Mar. 20, 2019

(65) Prior Publication Data

US 2019/0300062 A1    Oct. 3, 2019

(30) Foreign Application Priority Data

Apr. 2, 2018    (KR) ......................... 10-2018-0038275

(51) Int. Cl.
*B62D 25/08*    (2006.01)
*B62D 29/04*    (2006.01)
*B60R 19/34*    (2006.01)

(52) U.S. Cl.
CPC .............. *B62D 25/08* (2013.01); *B60R 19/34* (2013.01); *B62D 29/041* (2013.01)

(58) Field of Classification Search
CPC .... B62D 25/08; B62D 29/041; B62D 29/046; B62D 25/085; B60R 19/34; B60R 19/18; B60R 19/03; B60R 2019/1853; B60R 19/023; B60R 2019/026; B60R 2019/247
USPC ........ 293/133, 120, 132, 155, 121, 122, 110
See application file for complete search history.

(56) References Cited

U.S. PATENT DOCUMENTS

| 4,029,350 | A | * | 6/1977 | Goupy | ..................... B60Q 1/26 293/110 |
| 4,413,856 | A | * | 11/1983 | McMahan | ............... B60R 19/26 293/110 |
| 5,150,935 | A | * | 9/1992 | Glance | .................... B60R 19/30 293/136 |
| 6,502,874 | B2 | * | 1/2003 | Kajiwara | ................ B60R 19/18 293/120 |

(Continued)

*Primary Examiner* — Jason S Morrow
*Assistant Examiner* — E Turner Hicks
(74) *Attorney, Agent, or Firm* — Mintz Levin Cohn Ferris Glovsky and Popeo, P.C.; Peter F. Corless

(57) ABSTRACT

A unit of a combined front bumper beam and front end module ("CFF unit") is provided with a configuration in which an impact energy absorbing space formed is as a closed space and a chassis component mounting space is formed as an open space. The impact energy absorbing space and the chassis component mounting space are formed as an integrally formed structure. This structure is divided into a bumper back beam to which impact energy is transmitted, a crash box molded integrally with the bumper back beam to form the impact energy absorbing spaces at both sides of the bumper back beam, respectively, and a front end module carrier ("FEM carrier") molded integrally with the crash box to form the chassis component mounting space at the inward side of the crash box. The bumper back beam, the crash box and the FEM carrier form the CFF unit.

17 Claims, 7 Drawing Sheets

(56) References Cited

U.S. PATENT DOCUMENTS

| | | | |
|---|---|---|---|
| 8,469,417 B2* | 6/2013 | Di Modugno | B60R 19/34 |
| | | | 293/133 |
| 8,474,583 B2* | 7/2013 | Nagwanshi | B62D 21/15 |
| | | | 188/371 |
| 8,905,444 B2* | 12/2014 | Zannier | B60R 19/34 |
| | | | 293/132 |
| 9,067,550 B2* | 6/2015 | Nagwanshi | F16F 7/121 |
| 10,272,860 B2* | 4/2019 | Mohapatra | B60R 19/34 |
| 2010/0244472 A1* | 9/2010 | Gonin | B60R 19/12 |
| | | | 293/133 |

* cited by examiner

SECTION B-B

UNIT OF COMBINED FRONT BUMPER BEAM AND FRONT END MODULE INCLUDING CRASH BOX HAVING DUAL-SECTIONAL STRUCTURE

CROSS-REFERENCE TO RELATED APPLICATIONS

This application claims priority to Korean Patent Application No. 10-2018-0038275, filed on Apr. 2, 2018, which is incorporated herein by reference in its entirety.

BACKGROUND

Field of the Disclosure

The present disclosure relates to a unit of combined front bumper beam and front end module ("CFF unit") in which an impact energy absorbing space formed as a closed space and a chassis component mounting space formed as an open space are integrally formed with each other, and more particularly, to a CFF unit in which a crash box having a dual sectional structure is applied to an impact energy absorbing space to secure the impact absorbing ability while reducing the weight and manufacturing cost thereof.

Description of Related Art

Generally, a vehicle includes, as impact absorbing members during a frontal collision, a bumper back beam, a crash box and a front end module (FEM) carrier in which chassis components such as a radiator, a horn, a sensor and the likes are assembled into a module. The above-described members are coupled to each other via bolts or welding and are then coupled to a front side member of a vehicle body.

Therefore, to manufacture the conventional impact absorbing member, a process for separately manufacturing the bumper back beam, the crash box, the front end module carrier, and the like as well as an assembling process for assembling the components are required. Accordingly, assembling efficiency is reduced, the separate components increase the overall number of components, the weight, and cost, and quality distribution is reduced due to poor welding and the like.

SUMMARY

The present disclosure provides a unit of combined front bumper beam and front end module ("CFF unit") which may be manufactured through a simplified manufacturing and assembling process and have a simplified structure while securing the impact energy absorption.

In order to achieve the above object, the CFF unit according to the present disclosure having a crash box of a dual sectional structure may include an impact energy absorbing space formed as a closed space and a chassis component mounting space formed as an open space, wherein the impact energy absorbing space and the chassis component mounting space may be formed integrally with each other. In particular, the integrally formed structure may be divided into a bumper back beam to which impact energy is transmitted, a crash box molded integrally with the bumper back beam to form the impact energy absorbing spaces at both sides of the bumper back beam, respectively, and a front end module carrier ("FEM carrier") molded integrally with the crash box to form the chassis component mounting space at the inward side of the crash box. The bumper back beam, the crash box and the FEM carrier may form the CFF unit.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION

Figure 1:
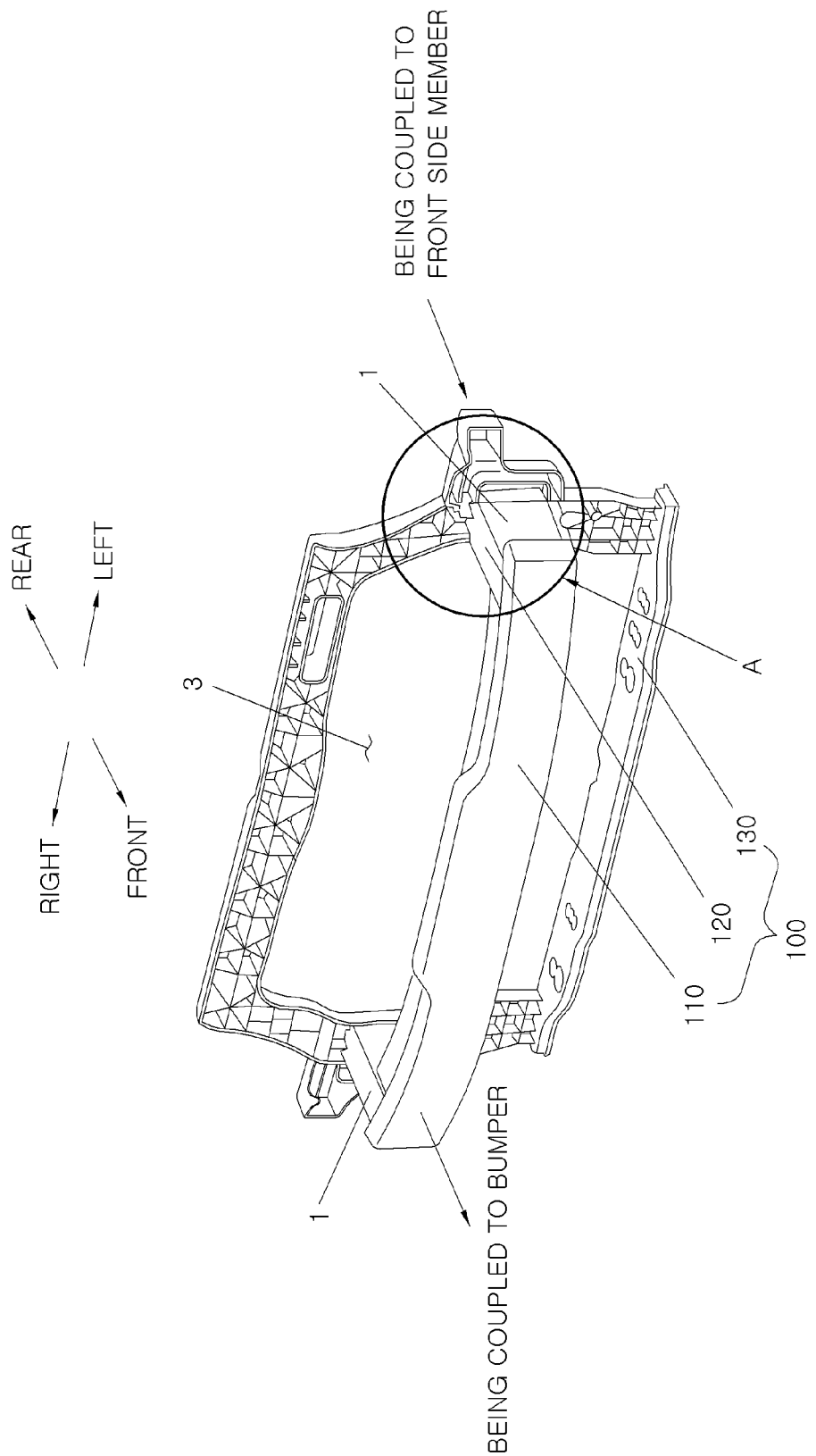
FIG. 1 is a perspective view a unit of combined front bumper beam and front end module ("CFF unit") according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

In order to fully understand the present disclosure, an exemplary embodiment of the present disclosure will be described with reference to the accompanying drawings. The exemplary embodiments of the present disclosure may be modified in various forms and the scope of the present disclosure should not be construed as being limited to the embodiments described in detail below.

The present exemplary embodiments are provided to more fully describe the present disclosure to those skilled in the art. Therefore, the shape and the like of the elements in the drawings may be exaggerated in order to emphasize a clearer explanation. It is to be noted that the same components in the drawings are denoted by the same reference numerals. Detailed descriptions on well-known functions and configurations that may unnecessarily obscure the gist of the present disclosure are omitted.

The present disclosure relates a unit including a combined front bumper beam and front end module (referred to as "CFF unit" below), having a configuration in which an impact energy absorbing space 1 formed as a closed space and a chassis component mounting space 3 formed as an open space are formed integrally with each other, This integrally formed structure may be divided into a bumper back beam 110 to which impact energy is transmitted, a crash box 120 molded integrally with the bumper back beam 110 to form the impact energy absorbing spaces 1 at both sides of the bumper back beam 110, respectively, and a front end module carrier (referred to as "FEM carrier" below) 130 molded integrally with the crash box 120 to form the chassis component mounting space 3 at the inward side of the crash box 120.

Particularly, the bumper back beam 110, the crash box 120 and the FEM carrier 130 may form the CFF unit 100. The CFF unit may be formed of glass fiber-matted reinforced thermoplastic. The glass fiber-matted reinforced thermoplastic may be a polypropylene resin and glass fiber mat reinforcing material, is about 20-25% lighter in weight than iron and has a strength which is substantially equal to that of steel. The glass fiber-matted reinforced thermoplastic having the above physical properties is a substitute for iron.

Figure 2:
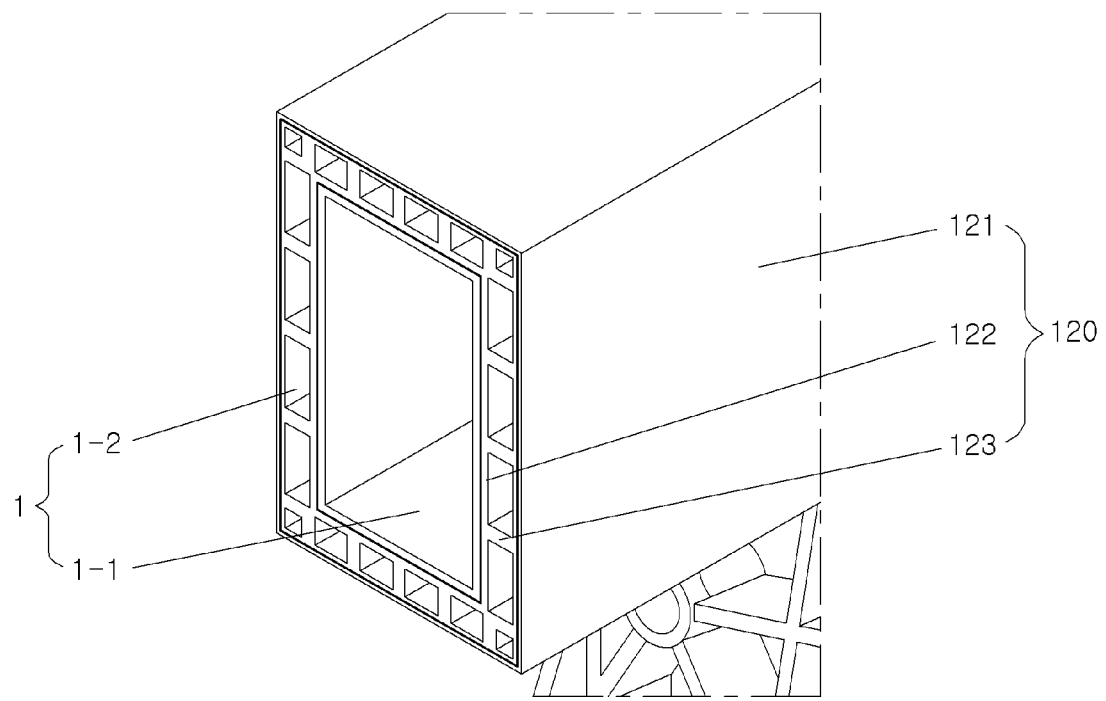
FIG. 2 is a detailed view of an indicated region A in FIG. 1 and shows a dual-sectional structure of a crash box according to an exemplary embodiment of the present disclosure.
Figure 3:
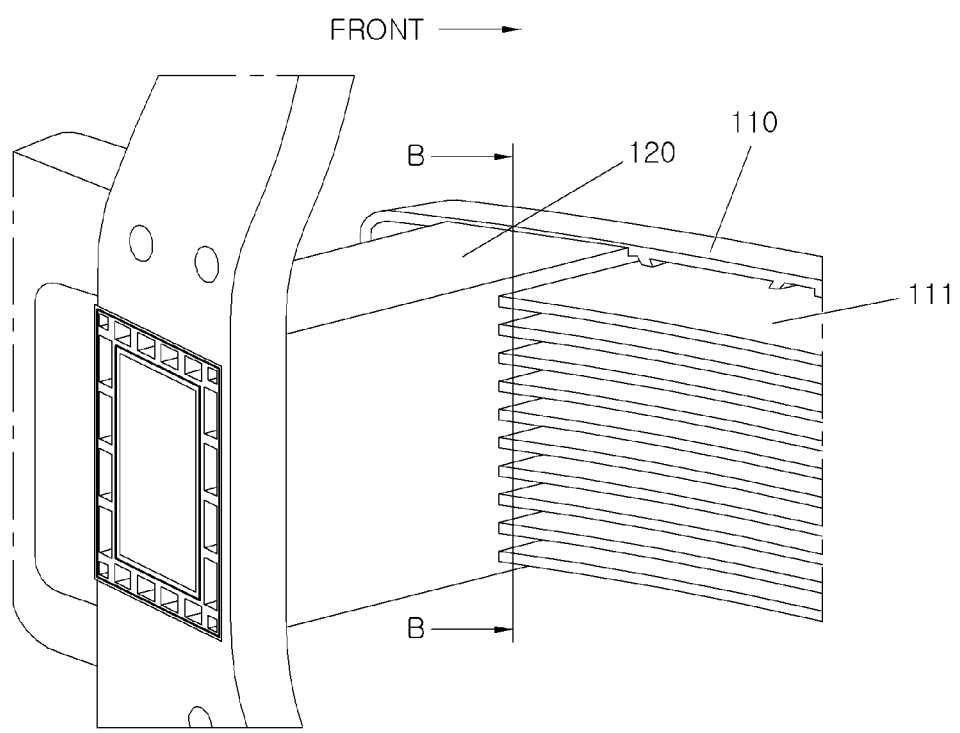
FIG. 3 is a partial enlarged perspective view of the CFF unit according to an exemplary embodiment of the present disclosure as viewed from a rear side of a vehicle.

FIG. 1 is a perspective view the CFF unit according to the present disclosure as viewed from a front side of a vehicle, and FIG. 2 is a detailed view of an indicated region A in FIG. 1 and shows a dual-sectional structure of the crash box seen by omitting the bumper back beam. FIG. 3 is a partial enlarged perspective view of the CFF unit according to the present disclosure as viewed from a rear side of a vehicle, and FIG. 4 is a cross sectional view taken along line B-B in FIG. 3.

Figure 4:
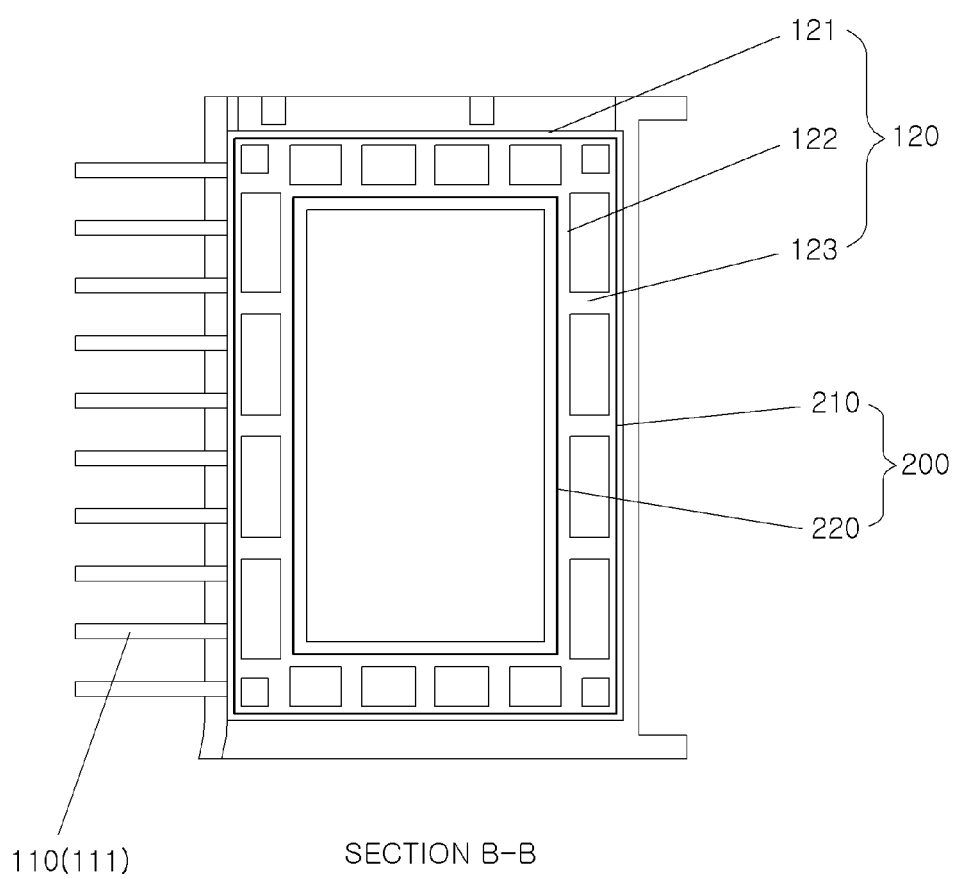
FIG. 4 is a cross-sectional view taken along line B-B in FIG. 3 according to an exemplary embodiment of the present disclosure.

As illustrated in FIGS. 3 and 4, the bumper back beam 110 may include a reinforcing rib 111. The reinforcing rib 111 may be formed on a rear face of bumper back beam 110 and may extend in a right-left direction of a vehicle (e.g., longitudinal direction), and both ends of the reinforcing rib 111 may be secured to the crash box 120. The plurality of reinforcing ribs 111 may be disposed in an upward-downward direction of the vehicle (e.g., vertical direction). As illustrated in FIGS. 2 and 4, the crash box 120 forms the impact energy absorbing space 1 having a dual sectional structure including an inner impact energy absorbing space 1-1 and an outer impact energy absorbing space 1-2. To form the dual sectional structure, the crash box 120 may include an outer body 121 and an inner body 122 disposed within the outer body 121.

The outer body 121 and the inner body 121 may be formed to have a closed loop in a section. Accordingly, an inner space of the inner body 122 may be formed as the inner impact energy absorbing space 1-1, and a space between the outer body 121 and the inner body 122 may be formed as the outer impact energy absorbing space 1-2. In addition, the dual sectional structure may include a rigid rib 123. The rigid rib 123 may be formed with both ends thereof connected to the inner body 122 and the outer body 121, respectively, in the outer impact energy absorbing space 1-2. The plurality of rigid ribs 123 may be formed in a peripheral direction of the crash box 123 to divide the outer impact energy absorbing space 1-2 into a plurality of spaces in the peripheral direction of the crash box 123. The rigid rib 123 may be formed integrally on the outer body 121 and the inner body 122.

The strengths of the inner impact energy absorbing space 1-1 and the outer impact energy absorbing space 1-2 may be reinforced by an insert unit 200, and the insert unit 200 may be a steel insert unit 200. In addition, the insert unit 200 may include an outer insert 210 disposed on the outer body 121 for reinforcing the strength of the outer impact energy absorbing space 1-2 and an inner insert 220 disposed on the inner body 121 for reinforcing the strength of the inner impact energy absorbing space 1-1. The inner insert 220 may be inserted into the inner body 122, and the outer insert 210 may be inserted into the outer body 123. The inner insert 220 and the outer insert 210 may be inserted into the inner body 122 and the outer body 123, respectively, to be integrally molded with each other.

As illustrated in FIG. 1, the FEM carrier 130 may be formed as a frame on an edge of the chassis component mounting space 3, and the FEM carrier 13 may be integrally molded with the bumper back beam 110. In addition, the FEM carrier 130 may be coupled with a front side member at a rear end of the bumper back beam 110, and the bumper back beam 110 may be coupled with a bumper of a front side of the vehicle.

Figure 5:
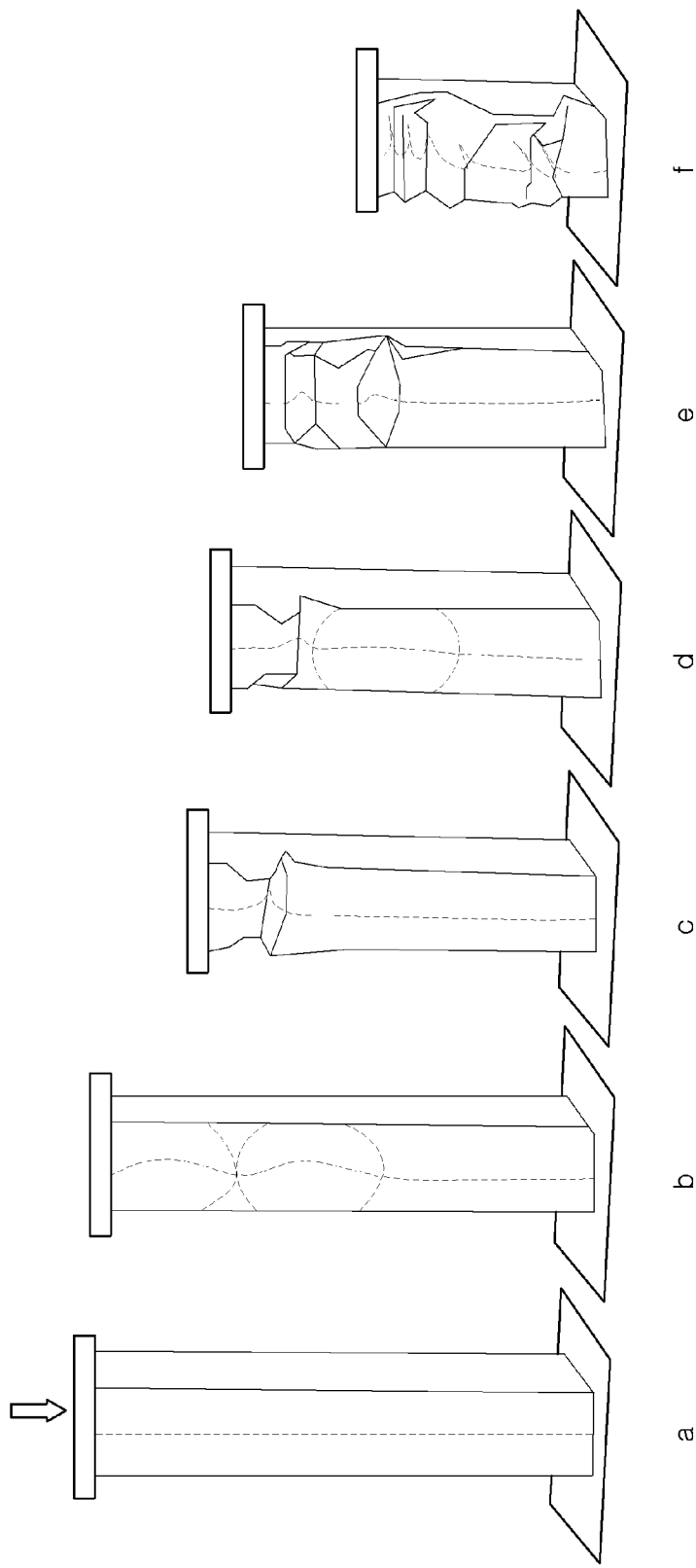
FIG. 5 is a view sequentially showing a state in which a test piece having a rectangular cross-sectional structure is buckled by energy transmitted in a direction perpendicular to a cross-section according to an exemplary embodiment of the present disclosure.
Figure 6:
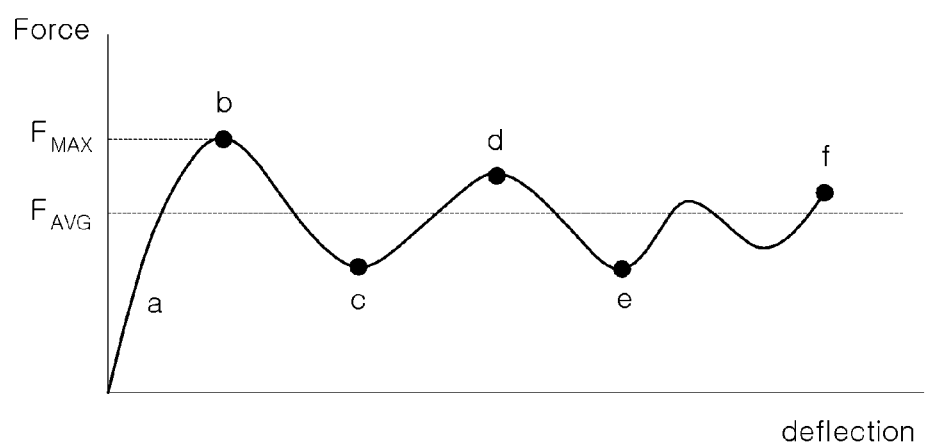
FIG. 6 is a view showing a change in a magnitude of energy according to a sequence illustrating in FIG. 5 according to an exemplary embodiment of the present disclosure.

FIG. 5 is a view sequentially showing a state in which a test piece having a rectangular cross-sectional structure is buckled by energy transmitted in a direction perpendicular to a cross-section, and FIG. 6 is a view showing a change in a magnitude of energy according to a sequence illustrating in FIG. 5. As shown in FIGS. 5 and 6, although the crash box having the rectangular cross-sectional structure requires maximum energy (b in FIG. 6) for an initial generation of buckling (b in FIG. 5), since then buckling can be proceeded with energy which is gradually lowered.

Figure 7A:
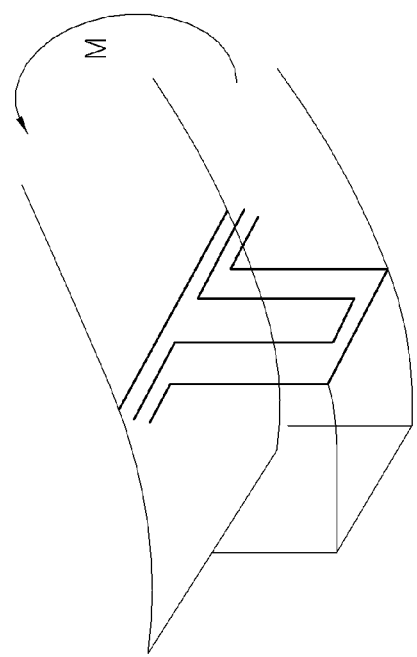
FIGS. 7A and 7B are views buckling degrees of the crash box in the case of having the dual-sectional structure and the case of not having the dual sectional structure.
Figure 7B:
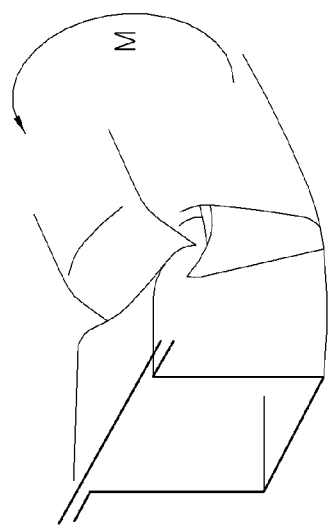

Therefore, in the CFF unit including the crash box having the dual sectional structure according to the present disclosure, in order to increase maximum energy (b in FIG. 6) for the initial generation of buckling (b in FIG. 5), the dual sectional structure and the insert unit 200 are applied to the crash box 120 as described above. In addition, when the same moment is applied to the crash box (FIG. 7B) to which the reinforcing section is added and the crash box (FIG. 7A) having a single sectional structure, unlike the crash box having the single section structure, buckling does not generate in the crash box to which the reinforced section is added.

Based on the contents of FIGS. 5 to 7, in the present disclosure, The CFF unit 100 in which the bumper back beam 110, the crash box 120 and the FEM carrier 130 are integrally molded with each other reduces a weight and manufacturing cost and enhances work efficiency, and strength against buckling may be increased by applying the dual sectional structure and the insert unit to the crash box 120. Accordingly, it may be possible to overcome the conventional problems and secure the impact energy absorbing capability equivalent to that of the prior art.

In the CFF unit including the crash box having the dual sectional structure according to the present disclosure, it can be expected that the number of components and the weight are reduced by integrally molding the plurality of components with each other and it can be expected that work efficiency is increased by omitting or simultaneously performing assembling processes and a molding processes for the components. In addition, although the CFF unit in which the plurality of components are integrally molded with each other and the reinforcing member (insert unit) that is thinner than that in the prior art are applied, the present disclosure can secure the impact energy absorbing ability which is equivalent to that of the prior art.

The embodiment of the present disclosure described above are merely illustrative, and it will be apparent to those skilled in the art to which the present disclosure pertains that various modifications and other equivalent embodiments may be made from the above embodiments. Therefore, it may be well understood that the present disclosure is not limited to the form set forth in the above detail description. Accordingly, the true scope of the present disclosure should be determined by the technical idea of the appended claims. In addition, it should be understood that the present disclosure includes all modifications, equivalents, and alternatives falling within the spirit and scope of the present disclosure defined by the appended claims.

What is claimed is:

1. A unit of combined front bumper beam and front end module ("CFF unit"), comprising:
    an impact energy absorbing space formed as a closed space; and
    a chassis component mounting space formed as an open space,
    wherein the impact energy absorbing space and the chassis component mounting space are formed as an integrally formed structure,
    wherein the integrally formed structure comprises:
    a bumper back beam to which impact energy is transmitted;
    a crash box molded integrally with the bumper back beam to form the impact energy absorbing space at each side of the bumper back beam, respectively; and
    a front end module carrier ("FEM carrier") molded integrally with the crash box to form the chassis component mounting space at an inward side of the crash box,
    wherein the crash box forms the impact energy absorbing space having a dual sectional structure,
    wherein an insert unit is integrally molded in the crash box to reinforce the crash box, and
    wherein the insert unit includes an outer insert embedded in an outer body of the crash box and an inner insert embedded in an inner body of the crash box.

2. The CFF unit of claim 1,
    wherein the bumper back beam, the crash box and the FEM carrier are molded integrally with one another to form the CFF unit.

3. The CFF unit of claim 1, wherein the CFF unit is formed of glass fiber-matted reinforced thermoplastic.

4. The CFF unit of claim 1, wherein the bumper back beam includes a reinforcing rib formed in a longitudinal direction thereof.

5. The CFF unit of claim 4, wherein a plurality of reinforcing ribs are formed on a rear face of the bumper back beam and disposed in a vertical direction of a vehicle.

6. The CFF unit of claim 1, wherein the dual sectional structure includes an inner impact energy absorbing space and an outer impact energy absorbing space.

7. The CFF unit of claim 6, wherein the dual sectional structure is formed by the outer body and the inner body of the crash box, the inner body forms the inner impact energy absorbing space, and the outer body and the inner body form the outer impact energy absorbing space.

8. The CFF unit of claim 7, wherein the dual sectional structure includes:
    a plurality of rigid ribs formed with both ends thereof connected to the inner body and the outer body of the crash box, respectively, in the outer inner impact energy absorbing space.

9. The CFF unit of claim 8, wherein the plurality of rigid ribs is formed integrally with the outer body and the inner body of the crash box.

10. The CFF unit of claim 9, wherein the plurality of rigid ribs divide the outer impact energy absorbing space into a plurality of spaces.

11. The CFF unit of claim 7, wherein the insert unit is configured to reinforce a strength of each of the inner impact energy absorbing space and the outer impact energy absorbing space.

12. The CFF unit of claim 11, wherein the insert unit is a steel insert unit.

13. The CFF unit of claim 11, wherein the insert unit includes:
    the outer insert is configured to reinforce the strength of the outer impact energy absorbing space; and
    the inner insert is configured to reinforce the strength of the inner impact energy absorbing space.

14. The CFF unit of claim 13, wherein the inner insert and the outer insert are inserted into the inner body and the outer insert, respectively, to be integrally molded with each other.

15. The CFF unit of claim 1, wherein the FEM carrier is formed as a frame on an edge of the chassis component mounting space.

16. The CFF unit of claim 15, wherein the FEM carrier is integrally molded with the bumper back beam.

17. The CFF unit of claim 15, wherein the FEM carrier is coupled to a front side member at a rear end of the bumper back beam.

* * * * *